UNITED STATES PATENT OFFICE.

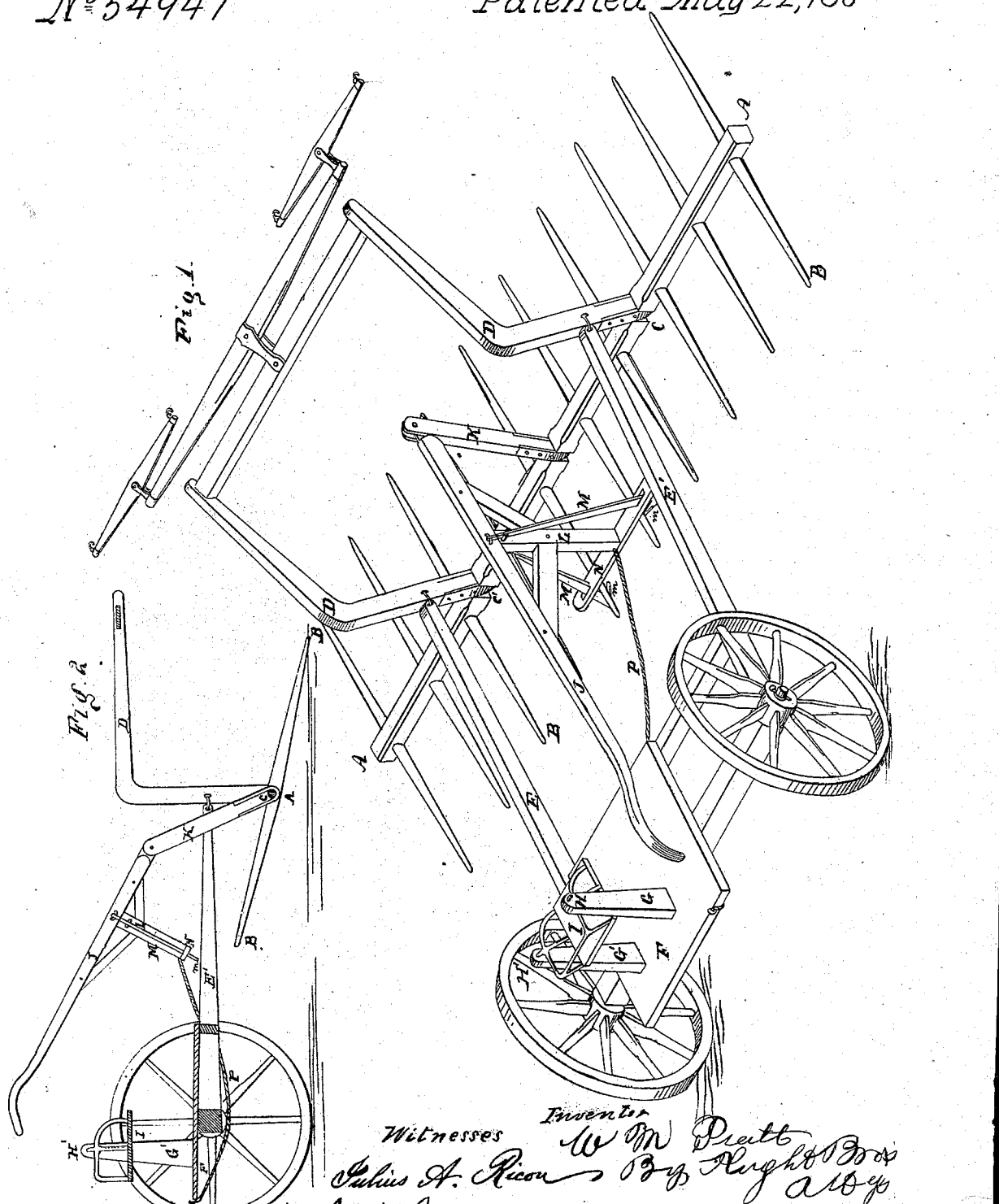

WILLIAM M. PIATT, OF WEST LIBERTY, OHIO.

IMPROVEMENT IN HORSE-RAKES.

Specification forming part of Letters Patent No. 54,947, dated May 22, 1866.

*To all whom it may concern:*

Be it known that I, WILLIAM M. PIATT, of West Liberty, Logan county, Ohio, have invented a new and useful Improvement in Horse Hay-Rakes; and I do hereby declare the following to be a full, clear, and exact description thereof, reference being had to the accompanying drawings, making part of this specification.

My improvement relates to the class of hay-rakes adapted to be drawn over the ground by a horse or other animal.

Figure 1 is a perspective view of a machine embodying my improvement. Fig. 2 is a longitudinal section of the same.

A and B represent, respectively, the head and teeth or tines of a customary revolving rake, which journals at C C' to a frame, D, to whose fore part the team is hitched. Linked to the frame D, a little above the rake-head, are the shafts E E' of my buggy F.

G G' are two standards or posts rising from the frame of the buggy and supporting the gudgeons H H' of a suspended seat, I, for the driver.

J is a lever or trigger connected by link K to the rake-head, and having hinged to and depending loosely from it a pair of dogs, M M', whose hooks $m$ are adapted to engage a pair of adjacent tines on the rear side of the head. The dogs M M' are restricted to their proper motion by a yoke, N, attached to an arm, L, which depends rigidly from the trigger, and being caused to engage the rear teeth of the rake hold the same to its work until liberated by the operator. The rake having made a revolution and deposited its load is again engaged by the operator through the medium of the trigger J. The act of liberation is initiated by simply elevating the trigger J, so as to cause the points of the forward tines to catch in the ground, and thus elevate the rear tines. This action operates to withdraw the rear tines endwise from the dogs, which, being held back by the cord P, slip off from and liberate the rake-head for a semi-revolution.

I claim herein as new and of my invention—

The arrangement of engaging and releasing mechanism J K L M N P, all constructed and operating as and for the purpose specified.

In testimony of which invention I hereunto set my hand.

WM. M. PIATT.

Witnesses:
GEO. H. KNIGHT,
JAMES H. LAYMAN.